United States Patent
Umetsu

[11] Patent Number: 6,005,371
[45] Date of Patent: Dec. 21, 1999

[54] CHARGING APPARATUS

[75] Inventor: Koji Umetsu, Miyagi, Japan

[73] Assignee: Sony Corporation, Japan

[21] Appl. No.: 09/026,374

[22] Filed: Feb. 19, 1998

[30] Foreign Application Priority Data

Feb. 20, 1997 [JP] Japan ................................ 9-036758

[51] Int. Cl.$^6$ ..................................................... H02J 7/04
[52] U.S. Cl. ........................................... 320/148; 320/164
[58] Field of Search ................................... 320/148, 135, 320/136, 149, 152

[56] References Cited

U.S. PATENT DOCUMENTS 5,200,690  4/1993  Uchida ..................................... 320/148
5,465,039  11/1995  Narita et al. ............................. 320/164

FOREIGN PATENT DOCUMENTS 0 642 202 A2  3/1995  European Pat. Off. .
9-182300  11/1997  Japan .

*Primary Examiner*—Peter S. Wong
*Assistant Examiner*—Lawrence Luk
*Attorney, Agent, or Firm*—Ronald P. Kananen; Rader, Fishman & Grauer

[57] ABSTRACT

The invention provides a charging apparatus capable of charging a secondary battery regardless of a drive state of a set circuit such as a video camera and a personal computer, and having a simple circuit configuration which can be realized at low production costs. A first resistor Ro is provided between a power source and the set circuit 1 and a secondary battery 2. A current flowing to the first resistor Ro is detected by an amplifier A2. This detection result is used to control a total current Io flowing to a set main body 3 including the set circuit 1 and the secondary battery 2 as a unitary block. Simultaneously with this, a current flowing to the second resistor Rb is detected by an amplifier A3 and this detection result is used to control a charge current Ib flowing to the secondary battery 2.

8 Claims, 9 Drawing Sheets

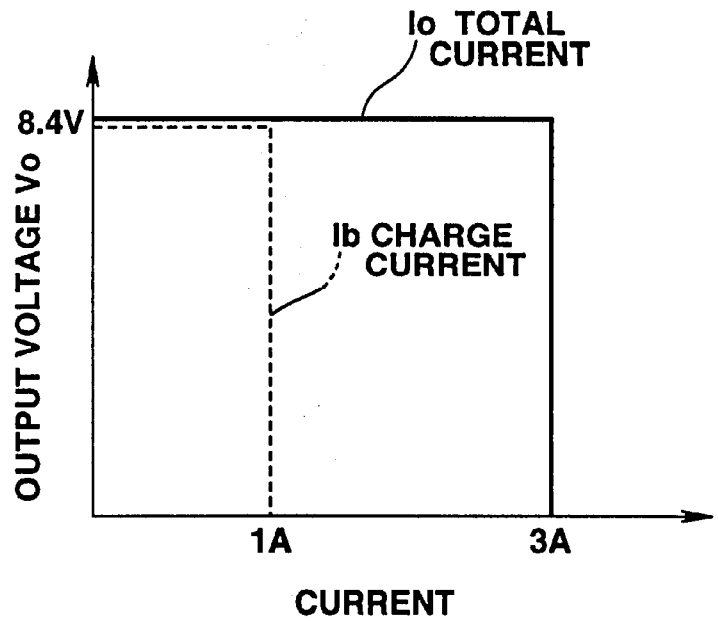
FIG.4
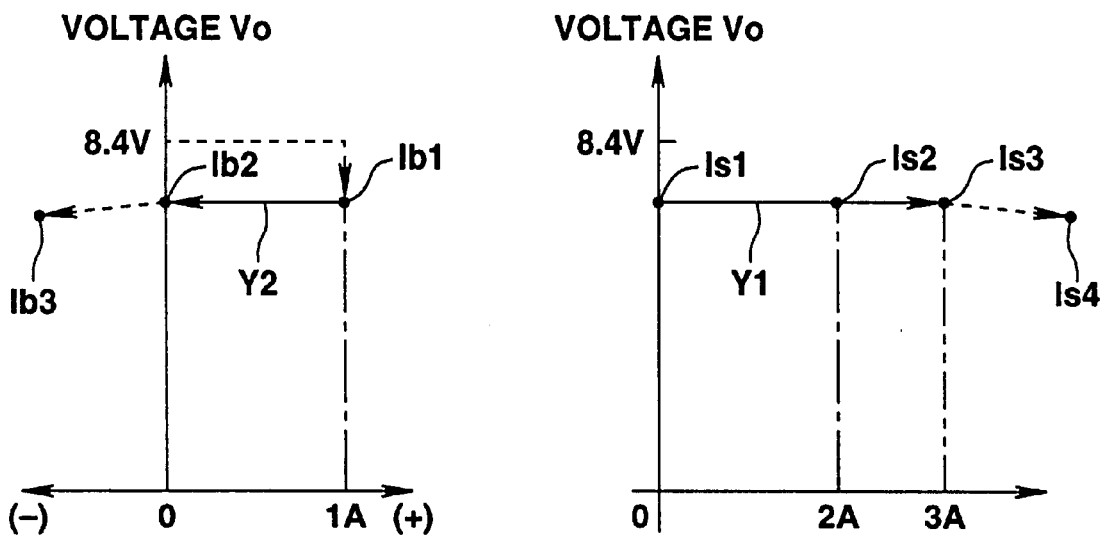
FIG.5A  FIG.5B

CHARGING APPARATUS

BACKGROUND OF THE INVENTION

1. Field of the Invention

The present invention relates to a charging apparatus for charging a secondary battery used for an apparatus driven by electric power such as a video camera and a personal computer, and in particular, to a novel charging apparatus capable of charging a secondary battery independently of the use/non-use state of the apparatus.

2. Description of the Prior Art

An apparatus driven by electric power such as a video camera and a personal computer (having a circuit which will be referred to as a set circuit hereinafter) is provided with a secondary battery which is chargeable as a drive power source and may be provided further with a charging apparatus for charging this secondary battery.

FIG. 1 shows a conventional circuit configuration of such a charging apparatus. It should be noted that FIG. 1 shows a case when a set circuit 101 and a secondary battery 102 are provided as a unitary block of a set main body 103 which is connected to an AC adapter 104 for power supply. That is, in the example of FIG. 1, the AC adapter 104 is connected to an AC power input so that current from the AC adapter 104 as an external power source is converted by the AC adapter 104 into a predetermined constant current for supply to the set main body 103. Moreover, the AC adapter 104 in the circuit configuration of FIG. 1 shows an output characteristic shown in FIG. 2.

In the example of FIG. 1, the set circuit 101 is connected between an output terminal VI from the AC adapter 104 and a grounding terminal G1 so as to receive a power supply via the AC adapter 104 from the AC power source. On the other hand, at the side of the secondary battery 102 built in the set main body 103, there is provided a switch Sw1 between a minus terminal of the secondary battery 102 and the grounding terminal G1. This switch S1 is turned on only when a signal indicating a lower power consumption state or a non-operation state is transmitted from the set circuit 101 as shown by an arrow S1 in FIG. 1. That is, in this charging apparatus, the switch Sw1 is turned only when the set circuit 101 is in the lower power consumption state or non-operation state, for charging the secondary battery 102.

In order to prevent that an excess current as a charge current Ib is supplied to the secondary battery 102, the set circuit 101 transmits a signal indicating that the secondary battery 102 is being charged, via a terminal C1 to the AC adapter 104. When the AC adapter is supplied with the signal indicating that the secondary battery 102 is being charged, the AC adapter 104 controls the current supplied to the set main body 103, so as to be a predetermined current value appropriate for charging the secondary battery 102.

If the set circuit 101 is in a drive state, a signal indicating the drive of the set circuit 101 is transmitted from the set circuit 101 through the terminal C1 to the AC adapter 104. This signal drives a switch Sw2 connected to one of the terminals of a current control amplifier Amp2, and the other terminal of the current control amplifier Amp2 is supplied with a first reference voltage Ref1.

Here, when the first reference voltage Ref1 is supplied to the one of the current control amplifier Amp2, the total current Io supplied to the set main body 103 is a set circuit current Is which drives the set circuit 101, so as to control the output from the AC adapter 104 as shown by a solid line IS in FIG. 2. That is, the current supplied from the AC adapter 104 to the set main body 103 is controlled so that the total current Io supplied to the set main body 103 will not exceed the maximum current value ISmax which can be supplied to the set circuit 101.

On the other hand, when the set circuit 101 is in the low power consumption state or non-operation state, a signal indicating that the set circuit 101 is in the low power consumption state or non-operation state is transmitted from the set circuit 101 via the terminal C1 to the AC adapter 104. This signal causes to drive the switch Sw2 connected to one of the terminals of the current control amplifier Amp2 built in the AC adapter 104, so that the input to the other terminal of the current control amplifier Amp2 is a second reference voltage Ref2.

If the one of the terminals of the current control amplifier Amp2 is supplied with the second reference voltage Ref2, the total current Io supplied to the set main body 103 is a charge current Ib to the secondary battery 102, and the output of the AC adapter 104 is controlled so as to be indicated by a dotted line IB in FIG. 2. That is, the current supplied from the AC adapter 104 to the set main body 103 is controlled so that the total current Io supplied to the set main body 103 will not exceed the maximum current value IBmax which can be supplied to the secondary battery 102.

In the conventional charging apparatus having the aforementioned configuration, the secondary battery is not charged while the set circuit is driven. Consequently, in the conventional charging apparatus, when charging the secondary battery, it is necessary that the set circuit be in the lower power consumption state or non-operation state, which causes various inconveniences.

It should be noted that there is also a charging apparatus capable of the secondary battery when the set circuit is other than in the lower power consumption state or non-operation state. However, such a conventional charging apparatus has a very complicated circuit configuration and cost much.

SUMMARY OF THE INVENTION

It is therefore an object of the present invention to provide a charging apparatus capable of charging a secondary battery even when a set circuit is in a drive state and having a simplified circuit configuration which can be realized at reduced costs.

The charging apparatus according to the present invention is a charging apparatus for charging a secondary battery used for a device driven by electric power, the apparatus including at least: first current detection means for detecting a current supplied to the electrically driven device; and second current detection means for detecting a current supplied to the secondary battery. According to the detection results of the first current detection means and the second current detection means, a current supplied to the electrically drive device and a current supplied to the secondary battery are controlled to be equal to or below predetermined values.

In this charging apparatus, the first current detection means detects a current supplied to the electrically driven device and the second current detection means detects a current supplied to the secondary battery. According to the detection results of the first current detection means and the second current detection means, a current supplied to the device and a current supplied to the secondary battery are controlled so as to be equal to or below predetermined values. That is, in this charging apparatus, the current supplied from a power source to the device and the current supplied from the power source to the secondary battery are detected and controlled independently from each other.

Consequently, in this charging apparatus, it is possible to charge the secondary battery regardless of the drive state of the device.

It should be noted that in the aforementioned charging apparatus, the aforementioned first current detection means. preferably has a first resistor connected to the aforementioned device so as to detect a current flowing through this first resistor. Moreover, the aforementioned second current detection means preferably has a second resistor connected to the aforementioned secondary battery, so as to detect a current flowing through this second resistor. Here, the first resistor is arranged, for example, between the power source and the device, and the second resistor is arranged, for example, between the device and the secondary battery.

Moreover, the charging apparatus preferably includes a diode provided between the secondary battery and the device.

Moreover, it is preferable that the charging apparatus be provided with current control means for controlling the current direction so as to supply a discharge current from the secondary battery to the device while no current is supplied from an external power source during a drive of the device. The current control means preferably includes a field-effect transistor provided between the aforementioned device and the secondary battery, for controlling the current direction using the field-effect transistor.

Furthermore, it is preferable that the aforementioned charging apparatus include a current control block for controlling a current supplied to the aforementioned device and a current supplied to the secondary battery. The current control block may be detachably attached to the aforementioned device having the secondary battery. It is also possible that the total of the current control block and the secondary battery may be detachably attached to the aforementioned device. Alternatively, each of the current control block, the device, and the secondary battery may be detachably attached to one another.

BRIEF DESCRIPTION OF THE DRAWINGS

FIG. 4 shows an output characteristic of an AC adapter of the charging apparatus shown in FIG. 3.

FIG. 5 consisting of FIG. 5A through 5B, shows in FIG. 5A a transition of a charge current Ib flowing to a secondary battery and in FIG. 5B a transition of a set circuit current Is flowing through a set circuit.

DETAILED DESCRIPTION OF THE PREFERRED EMBODIMENTS

Description will now be directed to embodiments of the present invention with reference to the attached drawings.

Figure 3:
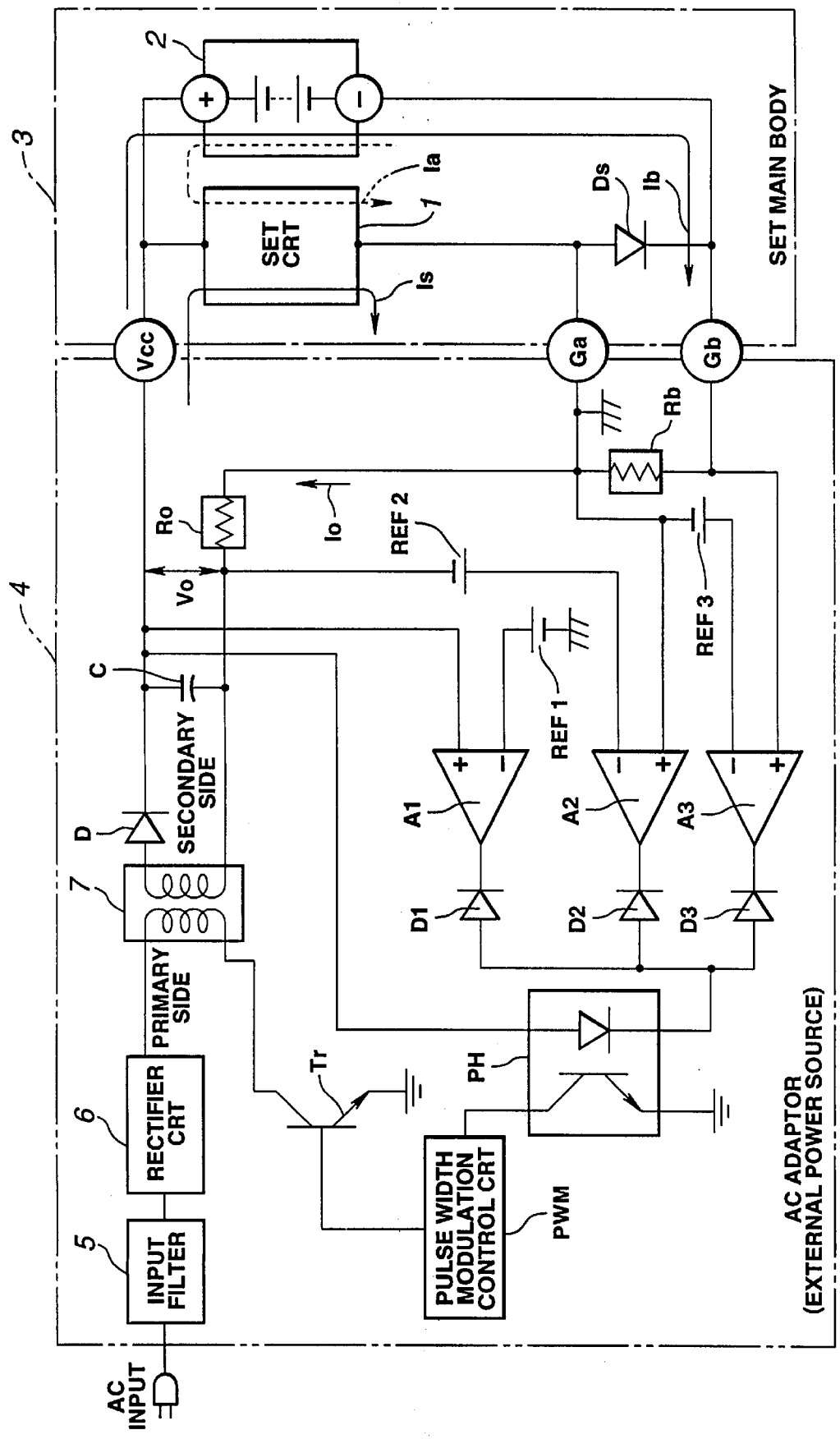
FIG. 3 is a circuit diagram of a charging apparatus according to an embodiment of the present invention.

FIG. 3 shows an example of a circuit diagram of the charging apparatus according to the present invention. It should be noted that this charging apparatus includes a set circuit 1 and a secondary battery 2 which constitute a unitary set main body 3 which can be detachably attached to an AC adapter 4 serving as a current control block for controlling currents to be supplied to the set circuit 1 and the secondary battery 2. FIG. 3 shows a connected state of the AC adapter 4 serving as an external power source for the set main body 3, connected to the set main body 3.

Figure 1:
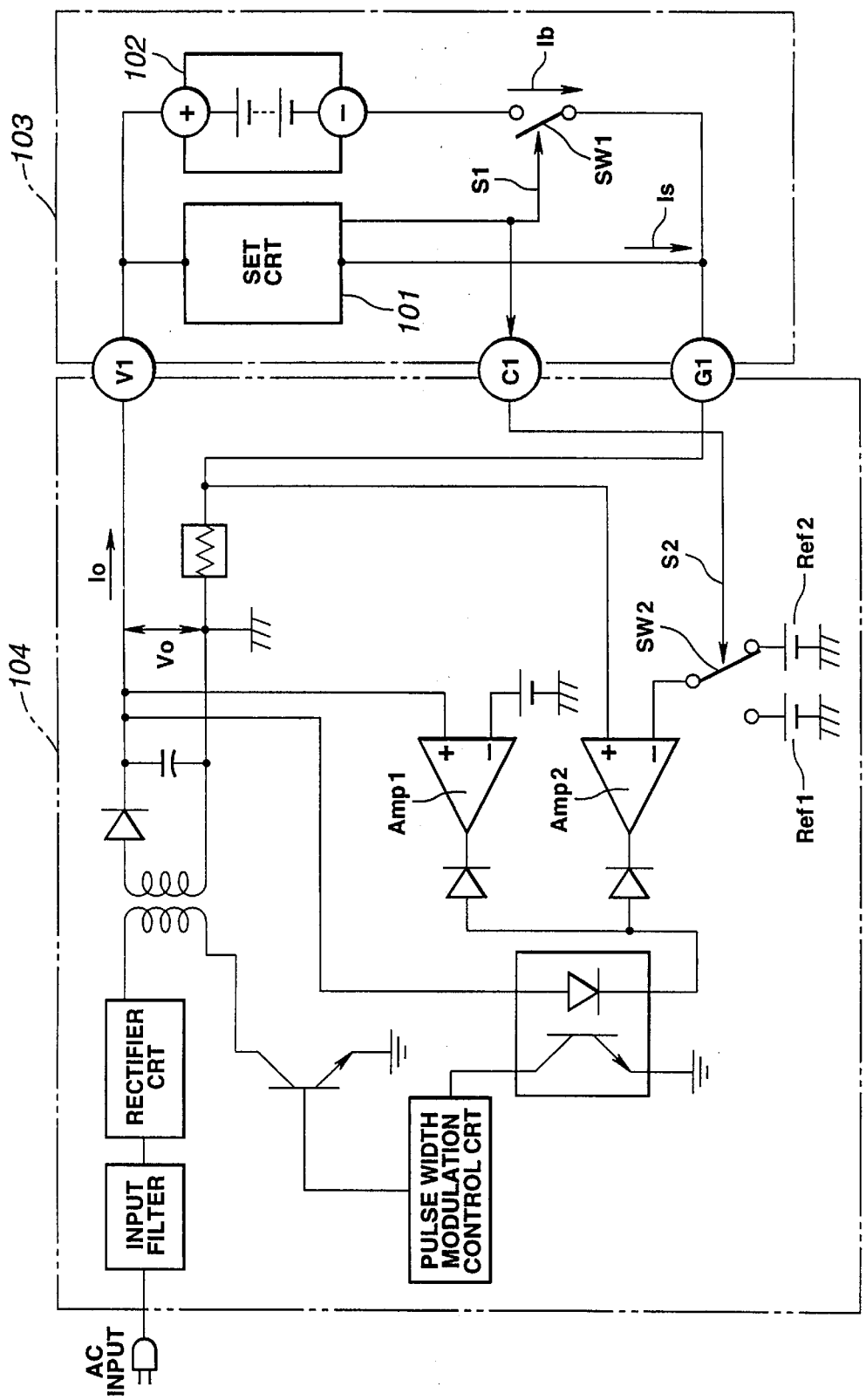
FIG. 1 is a circuit diagram of a conventional charging apparatus.
Figure 2:
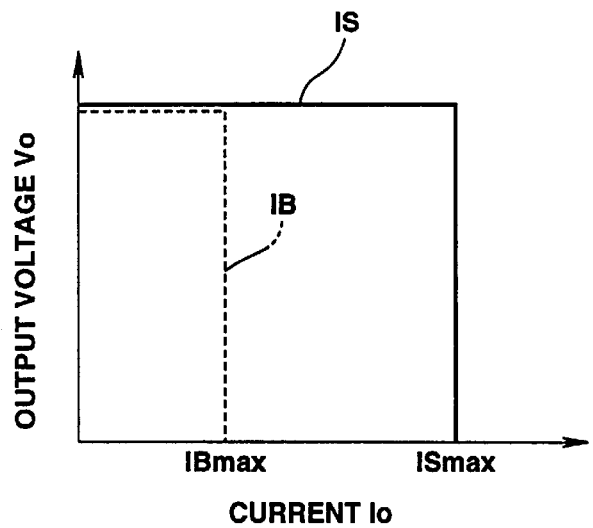
FIG. 2 shows an output characteristic of an AC adapter of the charging apparatus shown in FIG. 2.

That is, in the example of FIG. 3, the AC adapter is connected to an AC power source and the AC input is converted by the AC adapter 4 into a predetermined constant current which is supplied to the set main body 3. FIG. 4 shows an output characteristic of the AC adapter provided with the circuit configuration shown in FIG. 1. FIG. 5A shows a transition of a charge current Ib flowing to the secondary battery 2 and FIG. 5B shows a transition of a set circuit current Is flowing to the set circuit 1.

As shown in FIG. 3, the AC adapter 4 includes an input filter 5, a rectifier circuit 6, a power conversion transformer 7, a switching element Tr. a diode D, a capacitor C, a first resistor Ro, a second resistor Rb, a first amplifier A1, a diode D1 connected to the first amplifier A1, a second amplifier A2, a diode D2 connected to the second amplifier A2, a third amplifier A3, a diode D3 connected to the third amplifier A3, a photo coupler H supplied with signals from the first amplifier A1, the second amplifier A2, and the third amplifier A3, and a pulse width modulation control circuit PWM. It should be noted that the second amplifier A2 and the first resistor Ro constitute a first current detection means for detecting a total current Io supplied to the set main body 3, whereas the third amplifier A3 and the second resistor Rb constitute a second current detection means for detecting a charge current Ib supplied to the secondary battery 2.

The AC input from the AC power source is supplied via the input filter 5 and the rectifier circuit 6 to the power conversion transformer 7. Here, the power conversion transformer 7 is connected to the switching element Tr. Switching is carried out by the switching element Tr for converting the power from a primary side connected to the AC power source to a secondary side connected to the set main body 3. The current outputted from the secondary side of the power conversion transformer 7 is rectified by the diode D and the capacitor C so as to be outputted from an output terminal Vcc. Here, the output terminal Vcc is connected to an input terminal of the set circuit 1 and to a plus terminal of the secondary battery 2 so that an output from this output terminal Vcc is supplied to the set circuit 1 and the secondary battery 2.

At this moment, the output voltage from the AC adapter 4 is also applied to a plus terminal of the first amplifier A1. Here, a minus terminal of the first amplifier A1 is supplied with a predetermined reference voltage REF1. The first amplifier A1 compares this reference voltage REF1 to the output voltage from the AC adapter. According to this comparison, the first amplifier A1 transmits a signal via the diode D1 to the photo coupler PH so as make the output voltage from the AC adapter 4 a predetermined voltage, thus controlling the output voltage from the AC adapter 4. More specifically, the first amplifier A1 controls, for example, so that the output voltage from the AC adapter 4 is always 8.4 V or below.

On the other hand, the grounding terminal of the set circuit 1 is connected to a first grounding terminal Gs of the AC adapter 4, and this first resistor Ro has the other terminal connected to the capacitor C for rectification. This first resistor Ro serves to detect the total current Io supplied to the set main body 3. That is, the first resistor Ro detects a total of the set circuit current Is supplied to the set circuit 1 and the charge current Ib supplied to the secondary battery.

This first resistor Ro has the other terminal connected to a plus terminal of the second amplifier A2. This second amplifier A2 detects a voltage applied to the first resistor Ro, so as to detect the total current Io supplied to the set main body 3. Here the minus terminal of the second amplifier A2 is supplied with a predetermined reference voltage REF2. The second amplifier A2 compares this reference voltage REF2 to the voltage applied to the first resistor Ro. According to this comparison, the second amplifier A2 transmits a signal through the diode D2 to the photo coupler PH so as to make the total current Io supplied to the set main body 3 a value equal to or below a predetermined value, thus controlling the total current Io supplied from the AC adapter 4 to the set main body 3. More specifically, the second amplifier A2 controls the total current Io supplied to the set main body 3 to be always 3.0 A or below, for example.

Moreover, the minus terminal of the secondary battery is connected to a second grounding terminal Gb of the Ac adapter 4. Here, the second grounding terminal Gb is connected to the second resistor Rb. This second resistor Rb has the other terminal connected to the first grounding terminal Gs. That is, the minus terminal of the secondary battery is connected via the second resistor Rb to the first grounding terminal Gs. Here, the second resistor Rb serves to detect a charge current Ib supplied to the secondary battery 2.

The other terminal of this second resistor Rb is connected to the plus terminal of the third amplifier A3. This third amplifier detects a voltage applied to the second resistor Rb so as to detect the charge current Ib. Here, the minus terminal of the third amplifier A3 is supplied with a predetermined reference voltage REF3. The third amplifier A3 compares this reference voltage REF3 to the voltage applied to the second resistor Rb. According to this comparison, the third amplifier A3 transmits a signal via the diode D3 to the photo coupler PH so as to make the charge current Ib equal to or below a predetermined value, thus controlling the charge current Ib supplied from the AC adapter 4 to the secondary battery 2. More specifically, the third amplifier A3 controls, for example, so that the charge current Ib is always equal to or below 1.0 A.

Moreover, the minus terminal of the secondary battery is also connected to a cathode terminal of the diode Ds whose anode terminal is connected to the grounding terminal of the set circuit 1. This diode Ds serves the set circuit 1 with the secondary battery 2 when the AC adapter is removed.

As has been described above, the photo coupler PH is supplied with signals from the secondary side of the power conversion transformer 7, i.e., a signal from the first amplifier A1 supplied via the diode D1, a signal from the second amplifier A2 supplied via the diode D2, and a signal from the third amplifier supplied via the diode D3. The photo coupler PH supplies these signals to the pulse width modulation control circuit PWM. Here, the signal from the first amplifier A1 is a signal for controlling the output voltage, the signal from the second amplifier A2 is a signal for controlling the total current Io supplied to the set main body 3, and the signal from the third amplifier A3 is a signal for controlling the charge current Ib of the secondary battery 2. According these signals, the pulse width modulation control circuit PWM controls a switching time for adjusting the power supplied to the secondary side of the power conversion transformer 7.

In the charging apparatus having the aforementioned circuit configuration, the total current Io supplied to the set main body 3 and the charge current Ib supplied to the secondary battery 2 are respectively detected, and according to the detection results, the output from the AC adapter 4 is controlled, so that during a drive of the set circuit 1, a current required for driving the set circuit 1 is supplied to the set circuit 1 with a higher priority while supplying the secondary battery 2 with the charge current Ib which is a residual current subtracted by the set circuit current IS supplied to the set circuit 1.

Description will now be directed to the power control with the charging apparatus having the aforementioned configuration with reference to FIG. 4 and FIG. 5. It should be noted that in the explanation below, power control is assumed to be carried out in order that the output voltage from the AC adapter 4 is 8.4 V or below; the total current Io supplied to the set main body 3 is 3 A or below; and the charge current Ib supplied to the secondary battery 3 is 1 A or below. However, these voltage and current values are given here as examples and can be modified depending on the set circuit 1 and the secondary battery 1 actually employed.

When supplying a power from the AC adapter 4 to the set main body 3, firstly, the first amplifier A1 controls so that the output voltage from the AC adapter 4 is constantly 8.4 V.

Here, the voltage supplied to the first resistor Ro is detected by the second amplifier A2. According to this detection result, the second amplifier A2 controls so that the total current Io flowing to the set main body 3 is 3 A or below. That is, as shown by the solid line in FIG. 4, when the total current Io supplied to the set main body 3 has reached 3 A, the output voltage Vo from the AC adapter 4 is decreased so as to maintain the current Io at 3 A.

Simultaneously with this, the voltage applied to the second resistor Rb is detected by the third amplifier A3. According to this detection result, the third amplifier A3 controls so that the charge current Ib flowing to the secondary battery 2 is equal to or below 1 A. That is, as shown by the dotted line in FIG. 4, when the charge current Ib flowing to the secondary battery 2 has reached 1 A, the output voltage Vo from the AC adapter 4 is decreased so as to maintain the charge current Ib at 1 A.

At this moment, the circuit current Is flowing to the set circuit 1 is a difference between the total current Io flowing to the set main body 3 and the charge current Ib flowing to the secondary battery 2, which difference can be shown by Formula (1) as follows.

$$Is = Io - Ib \qquad (1)$$

As has been described above, in the aforementioned charging apparatus, power supply is simultaneously carried out to the set circuit 1 and to the secondary battery 2. Moreover, the current Io supplied from the AC adapter 4 to the set main body 4 is controlled according to the detection results of the second amplifier 2 and the third amplifier A3 so that the set circuit current Is supplied to the set circuit 1 and the charge current Ib supplied to the secondary battery 2 are equal to or below the predetermined values. That is, the total current Io supplied to the set main body is limited to equal to or below a predetermined current value (3 A in the aforementioned example) and the charge current Ib supplied to the secondary battery 2 is limited to equal to or below a predetermined current value (1 A in the aforementioned example).

Description will now be directed to the power control when the set circuit 1 is driven in a state of charging the secondary battery 2.

Firstly, it is assumed that the set circuit 1 is not driven and only the charging of the secondary battery 2 is carried out. In this state, the charge current Ib of 1 A is supplied to the secondary battery 2. Here, the voltage Vo is affected by the resistance of the secondary battery 2 and the like and is made slightly lower than 8.4 V. Note that in this state, the secondary battery is positioned at point Ib1 in FIG. 5A, whereas the set circuit 1 is positioned at point Is1 in FIG. 5B.

If the set circuit 1 is driven in this state, the set circuit current Is flows into the set circuit 1 and the set circuit current Is flowing into the set circuit 1 is increased as shown by an arrow Y1 in FIG. 5B. This leads to decrease of the charge current Ib supplied to the secondary battery 2, as shown by an arrow Y2 in FIG. 5A. That is, when the set circuit 1 is driven, the voltage of the set circuit 2 is lowered more than the voltage of the secondary battery 2 and the voltage difference leads to a decrease of the charge current Ib flowing into the secondary battery 2.

Since it is possible to supply the set main body in total with a current of up to 3 A, the charge current flowing into the secondary battery 2 is retained as 1 A while the set circuit current Is flowing into the set circuit 1 reaches 2 A. The state of the 2 A current flowing into the set circuit 1 is positioned at point Is2 in FIG. 5B.

When the set circuit current Is flowing into the set circuit 1 exceeds 2 A, the charge current Ib flowing into the secondary cell 2 is decreased by the exceeding amount. When the set circuit current Is flowing into the set circuit 1 is increased from 2 A to 3 A, the charge current Ib supplied to the secondary battery 2 becomes zero. That is, when the state of the set circuit 1 is shifted from the point Is2 to Is3 in FIG. 5B, the state of the secondary battery 2 is shifted from the point Ib1 to the point Ib2 in FIG. 5A.

As has been described above, in this charging apparatus, while the total current I1 flowing into the set main body 3 is equal to or below the predetermined current value, the charge current Ib is continuously supplied to the secondary battery 2 even if the set circuit current Is is supplied to the set circuit 1. That is, in the aforementioned charging apparatus, even when the set circuit 1 is driven, the secondary battery 2 is charged if there is power to spare.

On the other hand, in the conventional charging apparatus, it is impossible to simultaneously carry out the drive of the set circuit and charge of the secondary battery, and it is necessary to switch between the set circuit drive state and the secondary battery charge state when required. That is, in the conventional charging apparatus, when the set circuit is driven, no charging is carried out to the secondary battery, and the charging of the secondary battery is carried out while the set circuit is not driven. In contrast to this, in the aforementioned charging apparatus according to the present invention, it is possible to charge the secondary battery 2 while driving the set circuit 1 and accordingly, there is no need for switching between the drive state of the set circuit 1 and the charge state of the secondary battery 2, which facilitates handling of the apparatus.

Moreover, in the aforementioned charging apparatus, the output capacity from the AC adapter 4 is set either to the current capacity of the set circuit 1 or the charge current capacity of the secondary battery 2 which has a greater value. In the aforementioned charging apparatus according to the present invention, the set circuit current Is supplied to the set circuit 1 has a higher priority and it is possible to control the charge current Ib supplied to the secondary battery 2 according to the increase or decrease of the set circuit current Is. Consequently, when the power consumption of the set circuit 1 is small, the charge current Ib is increased to the maximum, reducing the charging time. On the contrary, when the power consumption of the set circuit 1 is large, the charge current Ib is decreased, so as to supply a sufficient current required for driving the set circuit 1. Thus, in the aforementioned charging apparatus, it is possible to effectively charge the secondary battery 2 by interlocking the charge of the secondary battery 2 with the drive of the set circuit 1.

In contrast to this, in the conventional charging apparatus, when operating the set circuit, only the current required for driving the set circuit is supplied from the AC adapter, and when charging the secondary battery, only the current required for charging the secondary battery is supplied from the AC adapter. Accordingly, in a case when there is a difference between the current capacity of the set circuit and the charge current capacity of the secondary battery, operation with a smaller current leads to the operation of the AC adapter having an excess output capacity, which lowers the efficiency.

Moreover, in the aforementioned charging apparatus according to the present invention, when an instantaneous large current (hereinafter, referred to as a rush current) flows into the set circuit 1 because of affects from a motor start or stop for example, it is possible to suffice the insufficient power by discharging from the secondary battery 2.

For example, if a rush current flows into the set circuit 1 when the state of the set circuit 1 is positioned at point Is3 in FIG. 5B, i.e., when a current of 3 A flows into the set circuit 1, and the state of the set circuit 1 is shifted from the point Is3 to point Is4 in FIG. 5B, the state of the secondary battery 2 is shifted from the point Ib2 to the point Ib3 in FIG. 5A so as to suffice the power insufficiency by discharging from the secondary battery 2.

That is, since the maximum value of the total current Io supplied from the AC adapter 4 is limited to 3 A or below, it is impossible to obtain a current exceeding this from the external power source. If the current flowing into the set circuit 1 exceeds 3 A due to a rush current, discharging from the secondary battery 2 compensates for the current.

That is, as shown in FIG. 3, when the set circuit current Is flows into the set circuit 1 and this set circuit current Is is below 3 A, the charge current Ib flows into the secondary battery 2. However, if the current Is flowing into the set circuit 1 exceeds 3 A due to a rush current, the discharge current Ia from the secondary battery 2 is supplied to the set circuit 1. It should be noted that in FIG. 3, the set circuit current Is is indicated by a solid line arrow Ib, and the discharge current Ia from the secondary battery 2 is indicated by a dotted line arrow Ia.

In the conventional charging apparatus, the AC adapter normally has a large output capacity taking such a rush current into consideration. In contrast to this, in the charging apparatus according to the present invention, as has been described above, if a rush current flowing into the set circuit 1 exceeds the maximum value of the total current Io supplied from the AC adapter 4, the current supplied to the set circuit is made up for by the discharge current Ia from the secondary battery 2. Consequently, in the aforementioned charging apparatus according to the present invention, it is not necessary that the AC adapter 4 have an large output capacity considering the rush current flowing into the set circuit 1. This enables to reduce the apparatus size as well as reduce the production costs.

Figure 6:
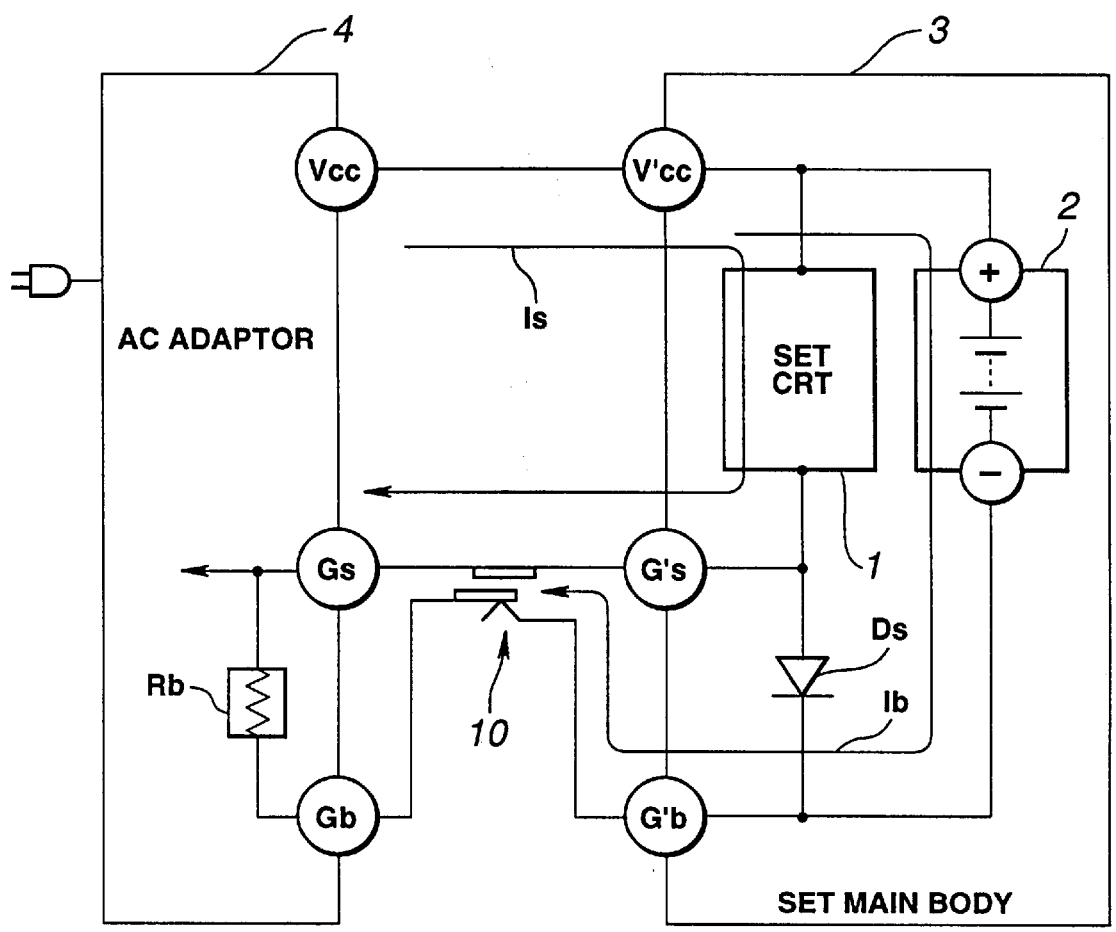
FIG. 6 shows a set main body connected via a connector to an AC adapter so that power is supplied from the AC adapter to the set main body.
Figure 7:
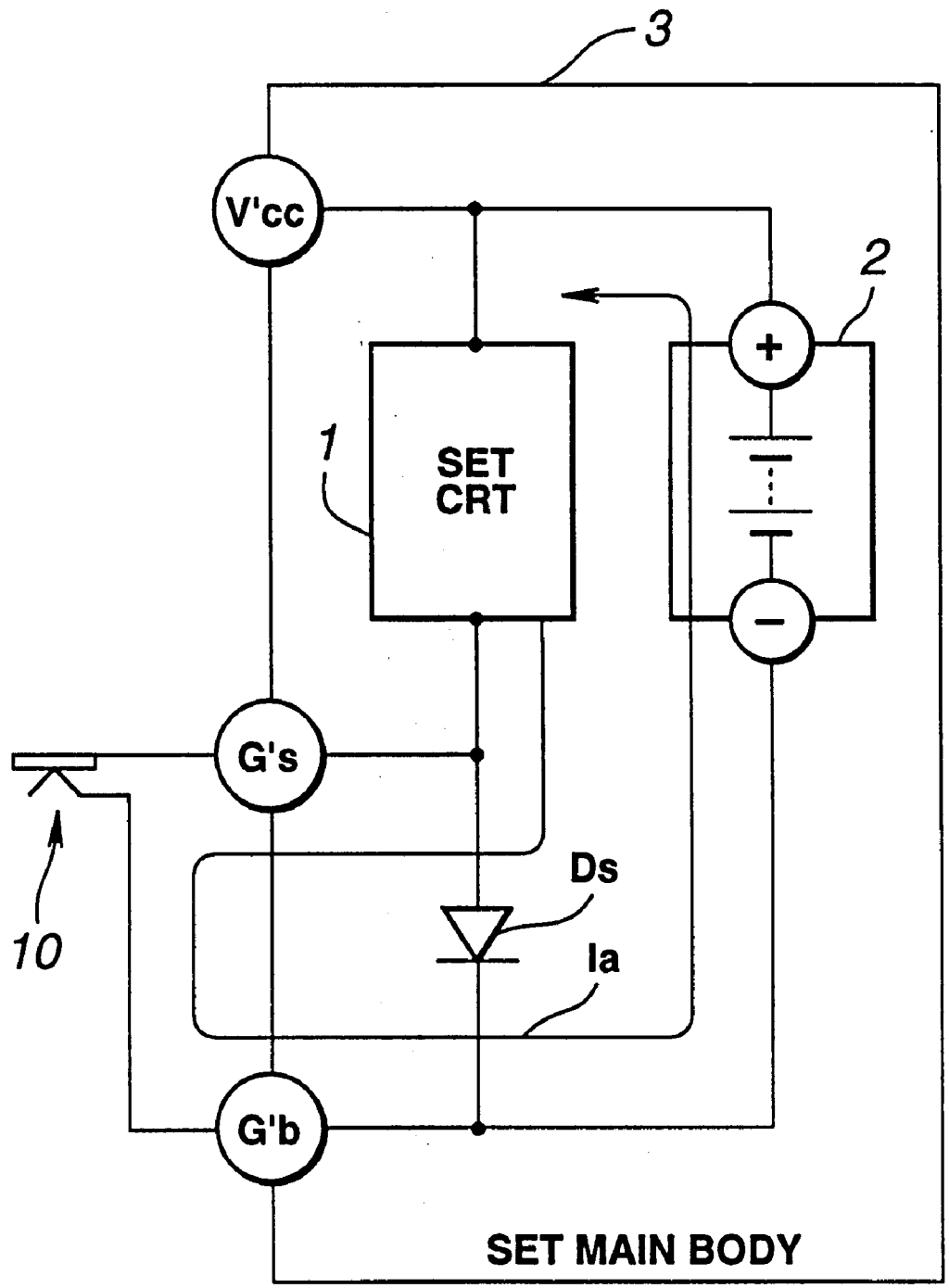
FIG. 7 shows the set main body detached from the AC adapter and electric power is supplied from a secondary batter built in the set main body, to the set circuit.

It should be noted that for connection between the set main body 3 and the AC adapter 4, as shown in FIG. 6 and FIG. 7, it is preferable to use a connector 10 having a constant structure between the first grounding terminal G's and the second grounding terminal G'b of the set main body 3 which are to be connected to each other when the AC adapter 4 is detached from the set main body 3.

Here, FIG. 6 shows a state of the set main body 3 connected through the connector 10 to the AC adapter 4 and electrical power is supplied from the AC adapter 4 to the set main body 3, and FIG. 7 shows a state of the set main body 3 detached from the AC adapter 4 when the set circuit 1 is supplied with power from the secondary battery 2 built in the set main body 3.

As shown in FIG. 6, when the aforementioned connector 10 is used to connect the set main body 3 to the AC adapter 3, the output terminal Vcc of the AC adapter 4 is connected to the input terminal V'cc of the set main body 3, the first grounding terminal Gs of the AC adapter 4 is connected to the first grounding terminal G's of the set main body 3, and the second grounding terminal Gb of the AC adapter 4 is connected to the second grounding terminal G'b of the set main body, so that the set circuit 1 is supplied with the set circuit current Is and the secondary battery 2 is supplied with the charge current Ib.

As shown in FIG. 7, when the AC adapter 4 is detached from the set main body 3, the first grounding terminal G's is connected to the second grounding terminal G'b in the set main body 3, so that the discharge current Ia from the secondary battery 2 is supplied to the set circuit 1.

By using the aforementioned connector 10, power supply is automatically carried out from the secondary battery 2 to the set main circuit 1 when the AC adapter 4 is detached from the set main body. This offers a very convenient system. Moreover, the use of the aforementioned connector 10 realizes automatic switching between the power supply sources without requiring any complicated circuit which is sure to increase the production costs.

Since the set main circuit 1 is connected to the secondary battery 2 through the diode Ds, even if the first grounding terminal G's is not connected to the second grounding circuit G'b in the set main body 3, the discharge current Ia from the secondary battery 2 is supplied to the set circuit 1 through the diode Ds. Consequently, even if a contact chattering is caused in the connector 10 for example, there will not be caused an instantaneous power supply stop.

As has been described above, even if the first grounding terminal G's is not connected to the second grounding terminal G'b in the set main body, i.e., the connection between them becomes open, the discharge current Ia from the secondary battery 2 is supplied through the diode Ds to the set main circuit 1. Consequently, it is possible to supply power from the secondary battery 2 to the set circuit 1 without using the aforementioned connector. However, the use of the aforementioned connector 10 is preferable, because it enables to effectively supply power from the secondary battery 2 to the set circuit 1 without passing through the diode Ds.

Figure 8:
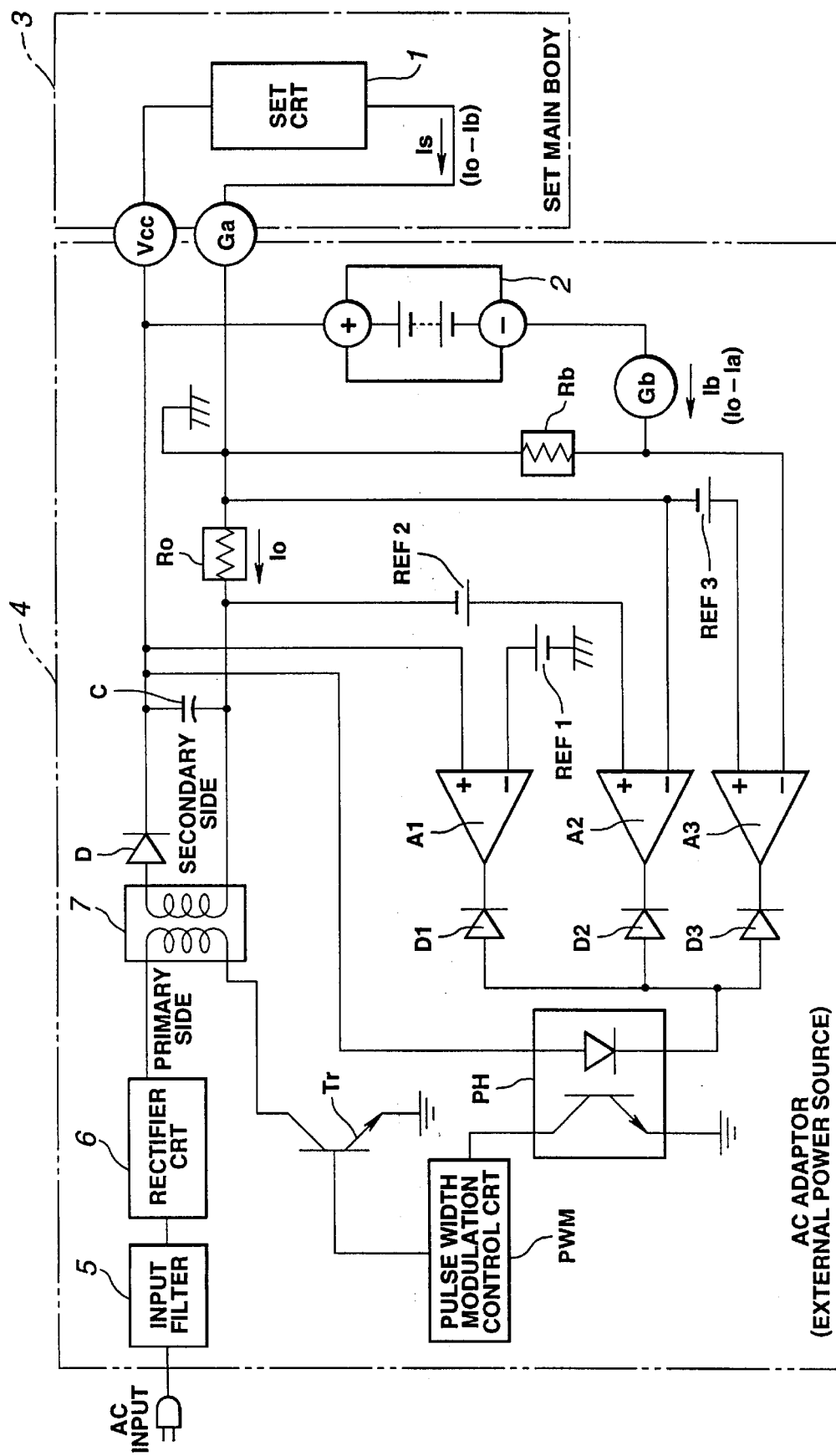
FIG. 8 shows a circuit diagram of the charging apparatus according to another embodiment of the present invention, in which a secondary battery is arranged inside the AC adapter so that the AC adapter can be detachably attached to the set main body.

In the aforementioned charging apparatus, the AC adapter 4 is connected to the set main body 3 consisting of the set circuit 1 and the secondary battery 2 as a unitary block. It is also possible, as shown in FIG. 8, to connect the set main body to the AC adapter 4 through the output terminal Vcc and the grounding terminal Gs, so that the AC adapter 4 having the built-in secondary battery 2 can be detachably attached to the set main body.

Similarly in the aforementioned charging apparatus, in this case too, the current supplied to the set circuit 1 and the current supplied to the secondary battery 2 are controlled to be equal to or below predetermined values by controlling the set circuit current Is supplied to the set circuit 1 and the charge current Ib supplied to the secondary battery 2 are controlled. That is, the total current Io flowing into the set main body 3 is controlled by the second amplifier A2 so as to be equal to or below a predetermined value, and the charge current Ib flowing into the secondary battery 2 is controlled by the third amplifier A3 so as to be equal to or below a predetermined value.

In this charging apparatus too, during drive of the set circuit 1, the set circuit current Is is supplied to the set circuit 1 with a higher priority and the secondary battery built in the AC adapter 4 is supplied with the charge current Ib which is a residual current of the total current Io subtracted by the set circuit current Is supplied to the set circuit 1.

It should be noted that when a rush current exceeding the maximum value of the total current Io flows into the set circuit 1 from an external power source, the discharge from the secondary battery 2 makes up for the insufficient current in the same way as in the aforementioned charging apparatus.

Figure 9:
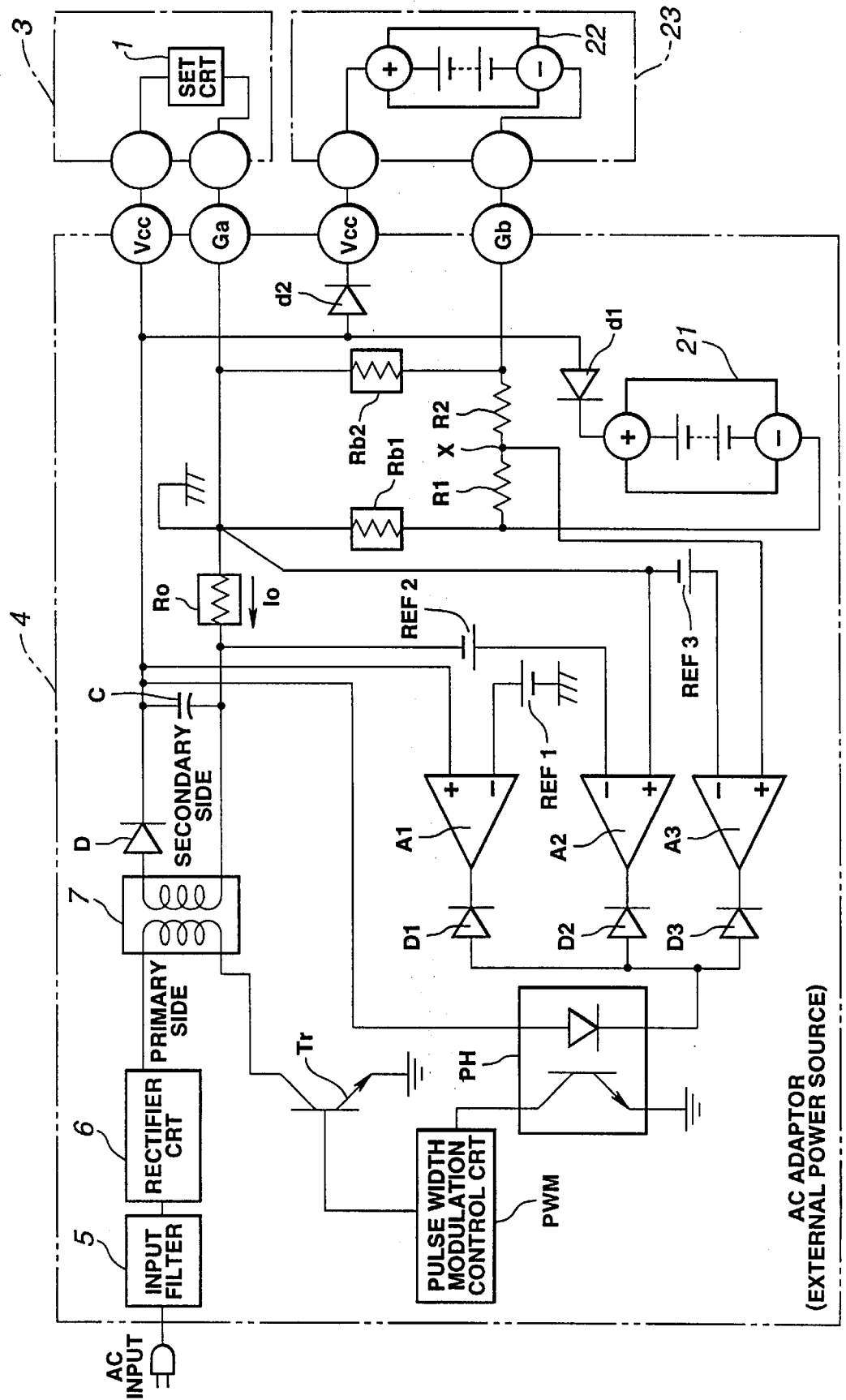
FIG. 9 shows a circuit diagram of the charging apparatus according to still another embodiment of the present invention, in which the AC adapter, the set main body, and the portion including the secondary battery can be detachably attached to one another.

Moreover, as shown in FIG. 9, it is possible to provide a first secondary battery 21 in the AC adapter 4 and connect the AC adapter 4 to the set circuit 1 and to a second secondary battery 22, so that the AC adapter 4, the set main body 3 having the set circuit 1, and a block 23 having the second secondary battery 22 can be detachably attached to one another.

In the charging apparatus of FIG. 9, the AC adapter is connected to the set main body 3 in the same way as in the aforementioned charging apparatus. However, as the secondary battery, there are provided the first secondary battery 21 and the second secondary battery 22, and the circuit relating to these batteries has a configuration as follows.

That is, as shown in FIG. 9, the first secondary battery 21 provided in the AC adapter 4 has a minus terminal connected to a first charge current detecting resistor Rb1 used as a resistor for detecting a charge current of the first secondary battery. This first charge current detecting resistor Rb1 has the other terminal connected to the first resistor Ro.

On the other hand, the second secondary battery 2 provided outside of the AC adapter 4 has a plus terminal connected to the output terminal Vcc of the AC adapter 4 and a minus terminal connected to the second grounding terminal Gb of the AC adapter 4. Here, the second grounding terminal Gb is connected to a second charge current detecting resistor Rb2 used as a resistor for detecting a charge current of the second secondary battery 22. This second charge current detecting resistor Rb2 has the other terminal connected to the first resistor Ro in the same way as the first charge current detecting resistor Rb1.

In order to control the total charge current flowing into the first secondary battery 21 and the second secondary battery 22, the minus terminal of the first secondary battery 21 and the minus terminal of the second secondary battery 22 are connected through two resistors R1 and R2 in series, and the middle point X of these resistors R1 and R2 is connected to the plus terminal of the third amplifier A3. With this third amplifier A3, the total current flowing in the first and the second secondary batteries 21 and 22 is detected so as to control the charge current not to exceed a predetermined value.

Moreover, a diode d1 is inserted in the input line to the first secondary battery 21 and a diode d2 is inserted in the input line to the second secondary battery 22. With this, even if a difference is caused in the battery voltage between the first secondary battery 21 and the second secondary battery 22, the current will not flow in the reverse direction. That is, these diodes d1 and d2 prevent the reverse flow, i.e., the current reverse flow from a battery of higher battery voltage to a battery of a lower battery voltage.

It should be noted that although FIG. 9 shows an example in which the first secondary battery 21 is provided in the AC adapter, but the present invention can also be applied to a case when the first secondary battery 21 is not used and the AC adapter 4 is connected respectively to the set main body 3 and to the secondary battery 22. In such a case, the diode d2 provided in the input line to the second secondary battery 22 is not required. When the diode d2 is removed, if a rush current exceeding the maximum value of the total current I1 supplied from an external power source flows into the set circuit 1, the second secondary battery 22 discharges so as to make up for the insufficient current.

Figure 10:
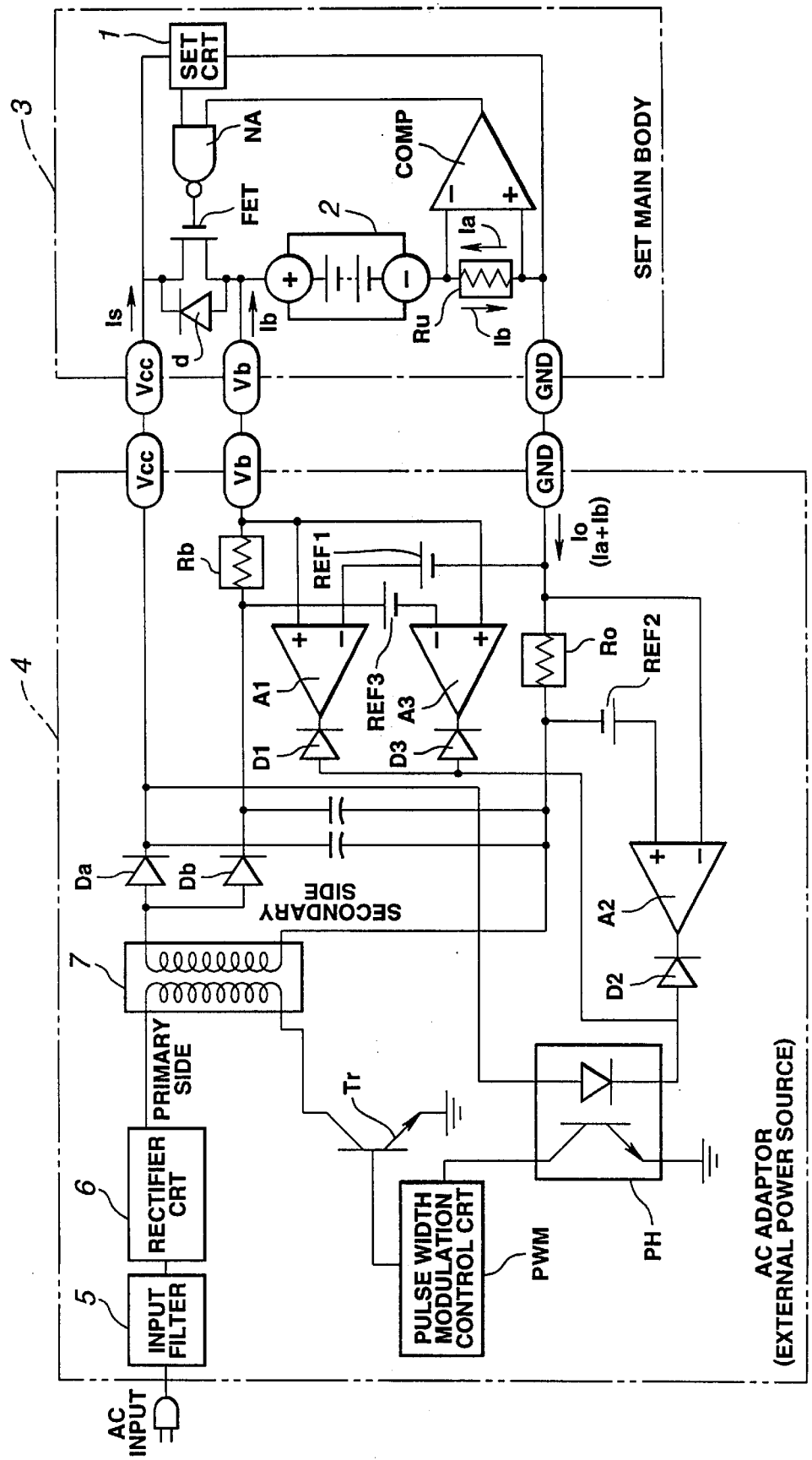
FIG. 10 shows a circuit diagram of the charging apparatus according to yet another embodiment of the present invention, in which a single grounding line is used at the interface between the AC adapter and the set main body and switching between charge/discharge of the secondary battery is automatically carried out.

Moreover, as shown in FIG. 10, it is possible to provide two diodes Da and Db as rectifier diodes for the secondary side of the power conversion transformer 7 and to divide the input line to the set main body 3 into a set input line (Vcc line) and a secondary battery input line (Vb line). Such a circuit configuration is especially effective when replacing the grounding line of the set circuit 1 and the grounding line of the secondary battery 2 with a single grounding line (GND line) at the interface between the AC adapter 4 and the set main body 3.

In this case, the input line rectified by the diode Db, i.e., the secondary battery input line is connected to the second resistor Rb used as the resistor for detecting the charge current supplied to the secondary battery 2. The third amplifier A3 detects the current flowing into this second resistor Rb and controls the current flowing into the secondary battery input line so that the charge current Ib supplied to the secondary battery 2 will not exceed a predetermined value.

Moreover, the grounding line is connected to the first resistor Ro used as the resistor for detecting the total current Io flowing into the set main body 3. The second amplifier A2 detects the current flowing into this first resistor Ro and controls the current flowing into the set input line and the secondary battery input line so that the total current Io flowing into the set main body 3 will not exceed a predetermined value. That is, the second amplifier A2 detects a sum of the current Is flowing into the set circuit 1 and the charge current Ib flowing into the secondary battery 2 and controls the current supplied from the AC adapter so that the total current Io supplied to the set main body 3 will not exceed a predetermined value.

In the aforementioned circuit configuration, the AC adapter operates in the same way as in the circuit configuration of FIG. 3 and exhibits the output characteristic as shown in FIG. 4.

Moreover, in the circuit configuration of FIG. 10, the field-effect transistor FET, the resistor Ru, the comparator COMP, and the NAND circuit NA are provided in the set main body 3 so that charge and discharge of the secondary battery 2 are automatically switched to each other.

The field-effect transistor FET is arranged between the set input line and the secondary battery input line. This field-effect transistor FET is in an OFF state while the charge current Ib flows into the secondary battery 2 and enters an ON state when the set circuit 1 is driven while no current is supplied from the AC adapter 4, i.e., when the discharge current Ia flows from the secondary battery 2. That is, when the set circuit 1 is driven while no current is supplied from the AC adapter, the field-effect transistor FET is turned ON so that the discharge current Ia from the secondary battery 2 is supplied to the set circuit 1.

Here, a diode d is arranged in the field-effect transistor FET. Consequently, even when the field-effect transistor is in its OFF state, if the secondary battery 2 discharges, the discharge current Ia from the secondary battery 2 flows through the diode d to the set circuit 1. However, as a diode forward voltage drop is caused, it is necessary to turn the field-effect transistor FET into its ON state when driving the set circuit 1.

To cope with this, in the circuit configuration of FIG. 10, the NAND circuit NA is used to switch the state of the field-effect transistor FET according to the charge state and discharge state of the secondary battery 2. That is, when the output from the NAND circuit NA is at high level, the field-effect transistor FET is in its OFF state, and when the output from the NAND circuit NA is at low level, the field-effect transistor FET is in its ON state.

Here, the NAND circuit NA is supplied through one of its input terminals with a signal indicating the drive state of the set circuit 1. That is, the set circuit 1, when is driven, supplies a high level signal Hi to the NAND circuit NA, and when is not drive, supplies a low level signal Low to the NAND circuit NA. Moreover, the NAND circuit NA has the other input terminal which is supplied with a signal from the comparator COMP as will be detailed below.

In the aforementioned set main body, the resistor Ru is connected between the minus terminal of the secondary battery 2 and the grounding terminal of the set circuit 1. This resistor Ru has one terminal connected to the plus terminal of the comparator and the other terminal connected to the minus terminal of the comparator COMP.

Power is supplied from the AC adapter 4, and if the charge current Ib is supplied to the secondary battery 2, the voltage applied to the minus terminal is higher than a voltage applied to the plus terminal of the comparator COMP, and a low level signal Low is supplied from this comparator COMP to the NAND circuit NA. As a result, the output from the NAND circuit NA becomes high level regardless of the drive state of the set circuit 1 and the field-effect transistor FET is turned to OFF state.

That is, while the secondary battery 2 is charged, the field-effect transistor FET is in an OFF state regardless of the drive state of the set circuit 1 and no current will flow from the set input line to the secondary battery input line.

On the other hand, if the set circuit 1 is driven while no power is supplied from the AC adapter 4, the discharge current Ia from the secondary battery 2 is supplied via the diode d to the set circuit 1. At this movement, the discharge current Ia from the secondary battery 2 makes the voltage applied to the plus terminal of the comparator COMP higher than the voltage applied to the minus terminal of the comparator COMP, so that a high level signal Hi is supplied from the comparator COMP to the NAND circuit NA. As a result, the output from the NAND circuit NA becomes low level and the field-effect transistor FET turns to its ON state so that the discharge current from the secondary battery 2 is supplied to the set circuit 1, enabling stable operation of the set circuit 1.

As has been described above, when the field-effect transistor FET is used for automatic switching between charge and discharge of the secondary battery 2, it is possible to prevent current flow from the set input line to the secondary battery input line and moreover, when the power supply from the AC adapter 4 is stopped, the power supply source to the set circuit 1 is automatically switched from the AC adapter 4 to the secondary battery 2, so that the discharge current Ia from the secondary battery 2 is supplied to the set circuit 1.

It should be noted that the charging apparatus according to the present invention is not limited to a particular configuration if a secondary battery is provided as a drive power source. It is possible to apply the present invention to a wide range of apparatuses which are driven by electrical power such as a video camera and a personal computer. Moreover, the secondary battery used is not limited to a particular type. For example, the secondary battery may be a lithium ion secondary battery, lithium polymer secondary battery, a nickel-hydrogen secondary battery, and the like.

As is clear from the aforementioned, the charging apparatus according to the present invention includes first current detecting means for detecting a current supplied to an electrically driven apparatus and second current detecting means for detecting a current supplied to a secondary battery. According to results of these detections, the currents supplied to the apparatus and the secondary battery are controlled to be equal to or below predetermined values, thus enabling to charge the secondary battery regardless of the drive state of the apparatus. Moreover, the charging apparatus according to the present invention can be realized as a simple circuit with low production costs.

What is claimed is:

1. A charging apparatus for charging a secondary battery used for an electrically driven device, said charging apparatus comprising at least:

first current detecting means for detecting a current supplied to said electrically driven device; and second current detecting means for detecting a current supplied to said secondary battery, wherein according to the detection results of said first current detecting means and said second current detecting means, currents supplied to said device and said secondary battery are controlled so as to be equal to or below predetermined values; and wherein said first current detecting means has a first resistor connected to said device for detecting a current flowing into said first resistor; and said second current detecting means has a second resistor connected to said secondary battery for detecting a current flowing into said second resistor.

2. A charging apparatus as claimed in claim 1, wherein a diode is provided between said secondary battery and said electrically driven device.

3. A charging apparatus as claimed in claim 1, said apparatus further comprising current control means for controlling a current direction so as to supply a discharge current from said secondary battery to said electrically driven device when no current is supplied from an external power source upon driving said electrically driven device.

4. A charging apparatus as claimed in claim 3, wherein said current control means includes a field-effect transistor arranged between said electrically driven device and said second battery, so as to be used for controlling a current direction.

5. A charging apparatus as claimed in claim 1, said apparatus further comprising a current control block for controlling current supplied to said electrically driven device and said secondary battery.

6. A charging apparatus as claimed in claim 5, wherein said current control block is detachably attached to a portion having said electrically driven device and said secondary battery.

7. A charging apparatus as claimed in claim 5, wherein a portion including said current control block and said secondary battery is detachably attached to said electrically driven device.

8. A charging apparatus as claimed in claim 5, wherein said current control block, said electrically driven device, and a portion including said secondary battery are detachably attached to one another.

* * * * *